June 11, 1935.   F. B. PFEIFFER   2,004,797
COLLAPSIBLE DRUM
Filed Dec. 31, 1931   6 Sheets-Sheet 1

INVENTOR
FRED BROWN PFEIFFER
BY
ATTORNEYS

June 11, 1935.   F. B. PFEIFFER   2,004,797
COLLAPSIBLE DRUM
Filed Dec. 31, 1931   6 Sheets-Sheet 2

INVENTOR
FRED BROWN PFEIFFER
BY
ATTORNEYS

June 11, 1935.   F. B. PFEIFFER   2,004,797
COLLAPSIBLE DRUM
Filed Dec. 31, 1931   6 Sheets-Sheet 3

INVENTOR
FRED BROWN PFEIFFER

BY

ATTORNEYS

June 11, 1935. F. B. PFEIFFER 2,004,797
COLLAPSIBLE DRUM
Filed Dec. 31, 1931 6 Sheets-Sheet 5

INVENTOR
FRED BROWN PFEIFFER
BY
ATTORNEYS

June 11, 1935.   F. B. PFEIFFER   2,004,797
COLLAPSIBLE DRUM
Filed Dec. 31, 1931   6 Sheets-Sheet 6

INVENTOR
FRED BROWN PFEIFFER

BY

ATTORNEYS

Patented June 11, 1935

2,004,797

UNITED STATES PATENT OFFICE 2,004,797

COLLAPSIBLE DRUM

Fred Brown Pfeiffer, Akron, Ohio, assignor to National Rubber Machinery Company, Akron, Ohio, a corporation of Ohio Application December 31, 1931, Serial No. 584,039

12 Claims. (Cl. 154—9)

This invention relates to collapsible drums or forms, and more especially it relates to collapsible tire-building drums such as are used in the rubber industry for the manufacture of tire casings by the flat band or pulley band method.

The chief objects of the invention are to provide an improved and simplified tire building drum of the character mentioned; to provide a tire building drum of relatively few parts; to provide such ruggedness of construction as will reduce breakage and upkeep to the minimum; to provide easy accessibility to all parts of the drum to facilitate adjustment thereof, such as the adjustment of its width; to prevent collapse of the drum under the pressure of tire-building tools applied to its surface; to provide maximum collapsing capacity; and to provide a drum that is in balanced condition when collapsed. In general, the invention aims to provide a superior tire building drum which may be manufactured at relatively low cost.

Of the accompanying drawings.

Figures 2, 3:
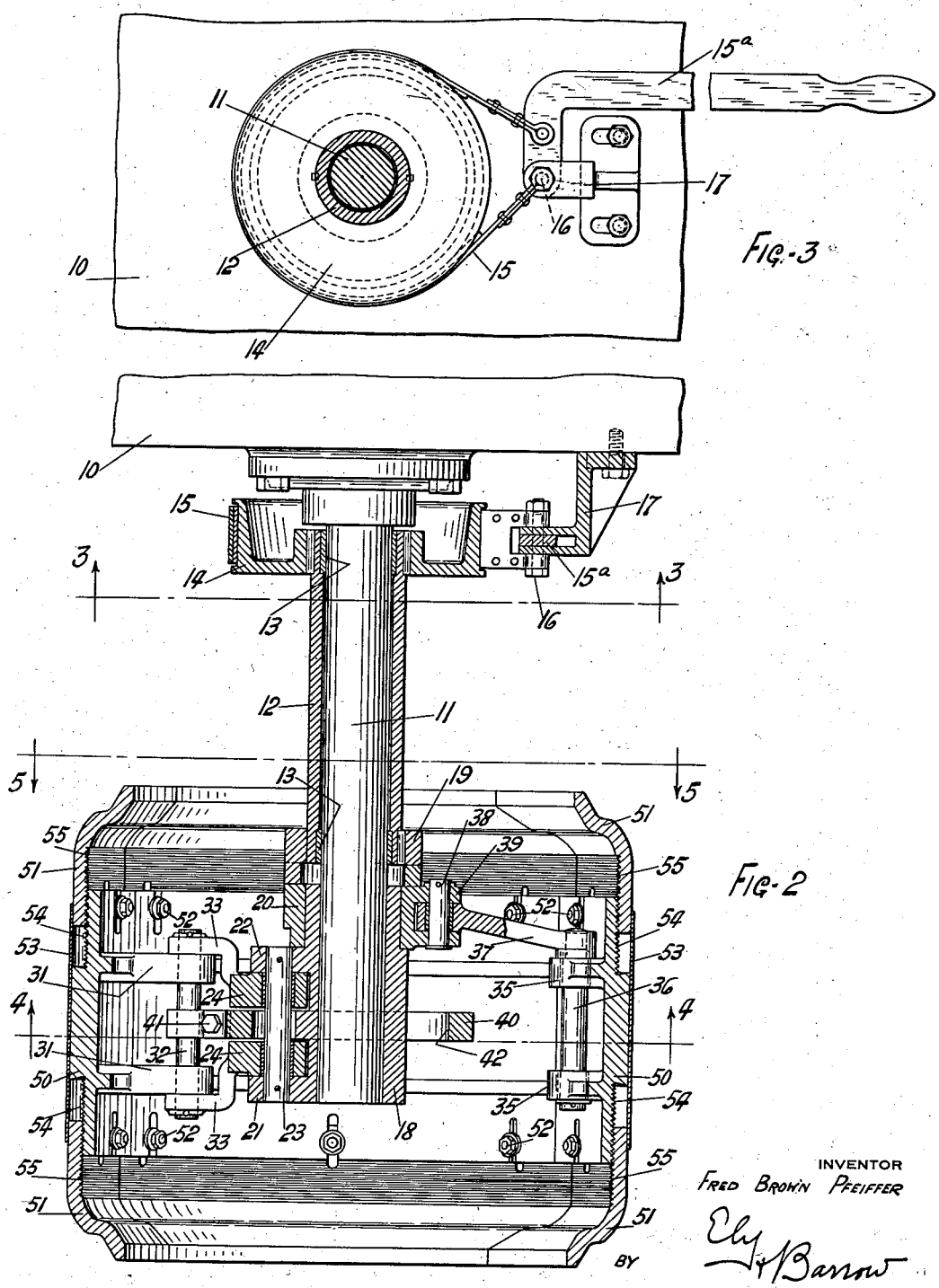
Figure 2 is a horizontal section thereof on the line 2—2 of Figure 1.
Figure 3 is an elevation of a brake associated with the drum, as viewed from line 3—3 of Figure 2.

Referring to the drawings, particularly Figures 2 and 3 thereof, 10 is the housing or frame of a tire building machine of any known or suitable design, and 11 is a horizontal rotatable spindle projecting therefrom and supporting on its free end a collapsible tire building drum. The drum is collapsed by relative movement of the spindle 11 and a sleeve or quill 12 that is journaled upon end-bushings 13, 13 that are mounted upon the spindle, the quill extending somewhat short of the outer end of the spindle. The end portion of the quill 12 adjacent the housing 10 has a brake-drum 14 keyed thereto, and a brake-band 15 that is trained around said brake drum has one of its ends fixedly attached at 16 to a bracket 17 that is mounted upon the housing 10, and has its other end secured to a hand-lever 15a that is fulcrumed on the bracket 17 at 16. The arrangement is such that the spindle and quill rotate in unison when the spindle is driven by reason of their interconnection with the collapsible drum as presently will be described, and application of the brake by means of the lever 15a causes relative movement of the spindle and quill which effects the collapsing of the drum.

Keyed to the outer end portion of the spindle 11, beyond the quill 12, is a hub 18, and keyed to the adjacent end portion of said quill is a driving collar 19 that has a driving connection with a toggle structure 20 that is journaled on the inner end portion of the hub 18 as is most clearly shown in Figure 2. The driving connection between the members 19, 20 is effected by means of intercalated jaws on their adjacent faces in the manner of a jaw clutch, the arrangement being such that the entire drum assembly including the hub 18 can be removed from the spindle without disturbing the driving collar 19 on the quill 12.

Figure 1:
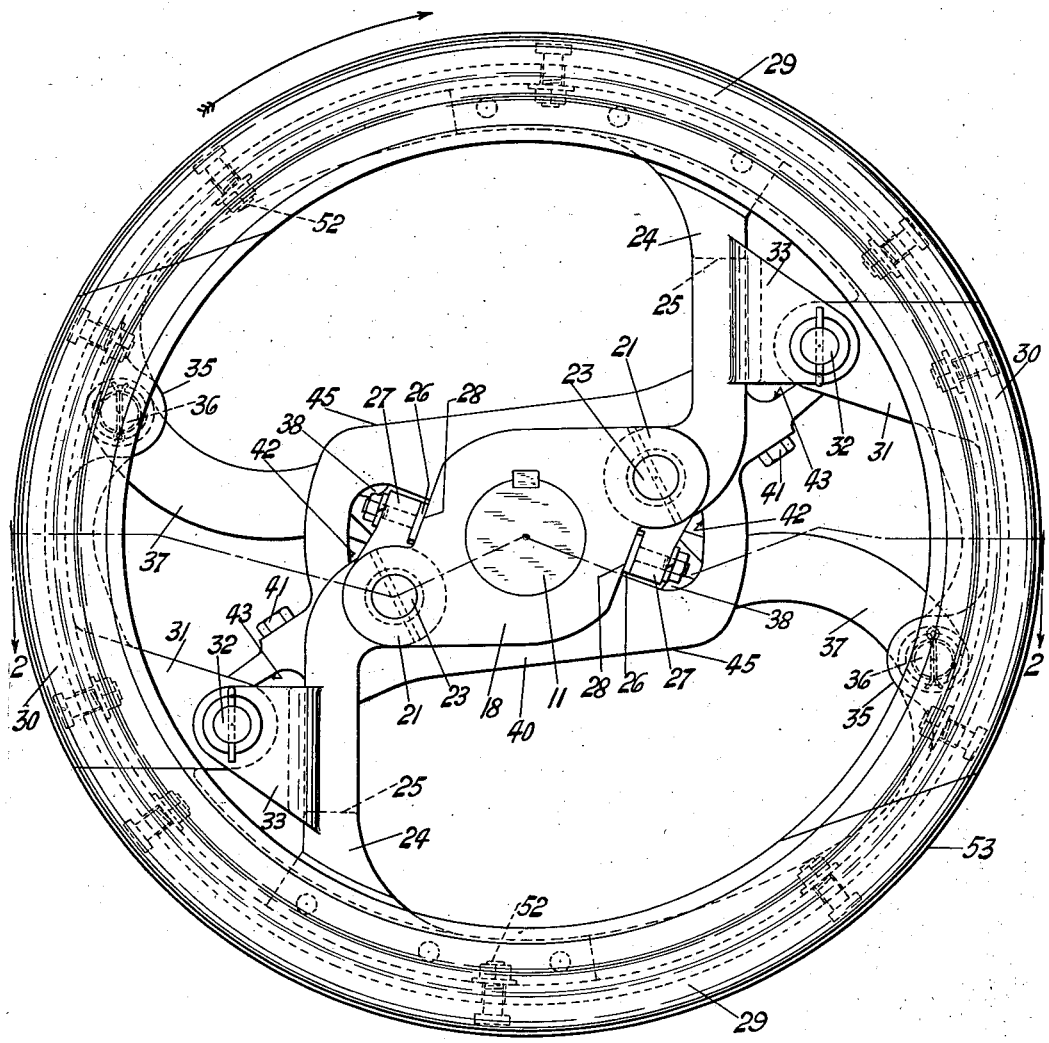
Figure 1 is a front elevation of a collapsible tire building drum embodying the invention in its preferred form, in its open or operative condition.
Figure 4:
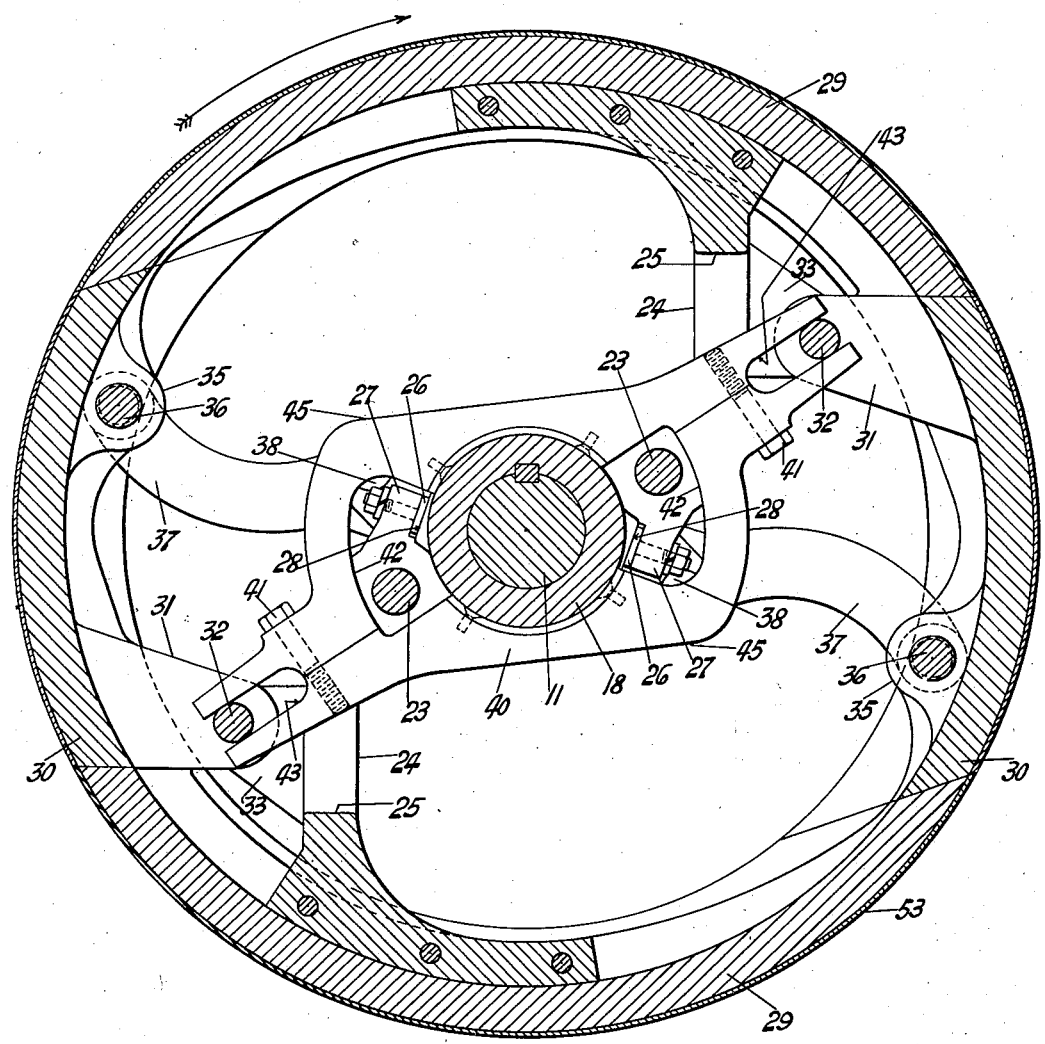
Figure 4 is a vertical section of the drum on the line 4—4 of Figure 2.

As is most clearly shown in Figures 1 and 2, the hub 18 is formed at its front end with a pair of oppositely directed brackets 21, 21 and near its rear end with a similar pair of brackets 22, 22, each pair of brackets 21, 22 constituting end supports for a pair of hinge pins 23, 23 that are secured therein, and disposed parallel to the axis of the drum at diametrically opposite points. Journaled upon the hinge pins 23 are respective arms 24, 24 that are curved at their inner end portions as shown so as to stand in non-radial relation to the axis of the spindle 11 and substantially tangential to the orbit of the pivot pins 23, whereby orbital movement of the latter urges the arms longitudinally. The inner end portion of the respective arms 24 is bifurcated or formed with a slot 25 as is most clearly shown in Figure 4. Pivotal movement of the arms 24 on the pivot pins 23 is determinately limited in one direction by stop-plates 26 which are secured to rearwardly projecting lugs 27, 27 formed on the arms 24, said plates 26 being so arranged as to abut against flattened portions 28, 28 formed on the hub 18. The plates 26 are bolted to the lugs 27 so as to be easily replaced when worn.

Mounted upon the outer ends of the arms 24 are respective intermediate sections 29, 29 of a tire building drum, the latter including relatively short key sections 30, 30 positioned between said intermediate sections in the expanded or operative condition of the drum. The abutting faces of the key sections and the intermediate sections are complementally oblique, the arrangement being such that the key sections may be swung inwardly away from the intermediate sections.

For pivotally supporting the key sections 30, each of them is formed at one end with a pair of spaced-apart, inwardly extending apertured ears 31, 31 that embrace a pivot pin 32 that is journaled in a pair of spaced-apart, apertured ears 33, 33 formed on an arm 24 in the middle region thereof. For swinging the key sections inwardly or outwardly about their pivots 32, the opposite end of each key section is formed with a pair of inwardly extending apertured lugs 35, 35 in which is journaled a pin 36, one end portion of said pin being connected by an arcuate link 37 to a pivot pin 38 mounted in an outstanding ear 39 formed on the toggle structure 20, the respective pins 38 being disposed at diametrically opposite points with relation to the axis of said toggle structure. Movement of the links 37 about their pivots 38 is limited in one direction by stop-lugs 37a formed on the respective links, which lugs are adapted to abut suitable flat surfaces formed on opposite sides of the toggle structure 20, in which position the pivots 36 are over center with relation to a line drawn through the axis of the spindle and the pivot pins 38.

Journaled upon the central portion of the hub 18 is a two-part synchronizing and control plate 40, the parts thereof being secured together by the set screws 41, 41. Adjacent the hub the plate 40 is formed with concentric, diametrically opposed, arcuate slots 42, 42 (see Figure 4) through which the pivot pins 23 extend, the arrangement permitting angular movement of the control plate upon the hub. The control plate is formed with oppositely directed radial extensions that are disposed within the slots 25 of the arms 24, said extensions having end-slots 43, 43 in which the pivot pins 32 ride, with the result that the arms 24, in manipulating the intermediate drum sections 29, are caused to act in unison. Two opposite local regions 45, 45 on the margin of the control plate constitute cam surfaces which perform the important function of controlling the collapsing of the drum.

Although the invention is applicable to any type or shape of tire building drum, it is especially applicable to drums having laterally adjustable marginal members, and this is so because of the relatively few elements of the drum, and the fact that the key sections are pivotally mounted elsewhere than on the intermediate sections, which arrangement makes possible the provision of ample room for convenient access to the bolts which secure the adjustable marginal portions of the drum. As is most clearly shown in Figure 2, each of the drum sections 29, 30 comprises a central main or body portion 50, adjustable lateral portions 51, 51, bolts 52, 52 for holding the lateral portions in adjusted relation to the body portion 50, and a plate 53 secured to the outer peripheral surface of the latter and overlying the space between it and each of the lateral portions.

Preferably the lateral flanges of the body portion 50, upon which the lateral portions 51 seat, have their outer peripheral faces knurled or grooved as is shown at 54, and the inner peripheral surfaces of the lateral sections are complementally knurled or grooved as shown at 55. The arrangement provides a plurality of determinate positions for the lateral portions upon each of the body portions, so that in the positioning of the lateral portions it is only necessary to gauge and accurately position the lateral portions of one section, it then being possible easily to align therewith the lateral portions of the other sections, since the misalignment of any lateral member would be visibly apparent. The plates 53 are sufficiently flexible to permit the knurling or teeth 55 to ratchet over the teeth 54 in the adjusting of the lateral members.

Figure 5:
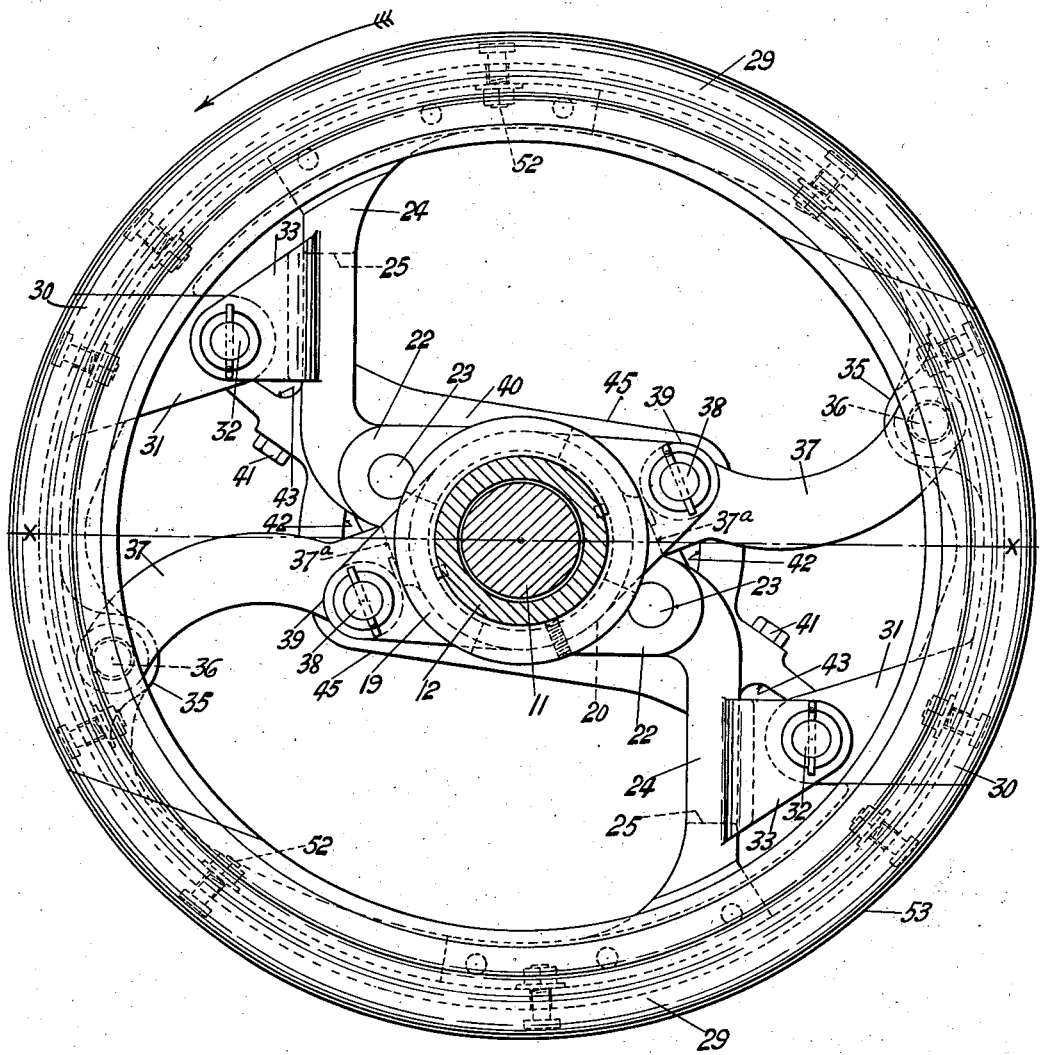
Figure 5 is a rear elevation of the drum as viewed from line 5—5 of Figure 2.
Figure 6:
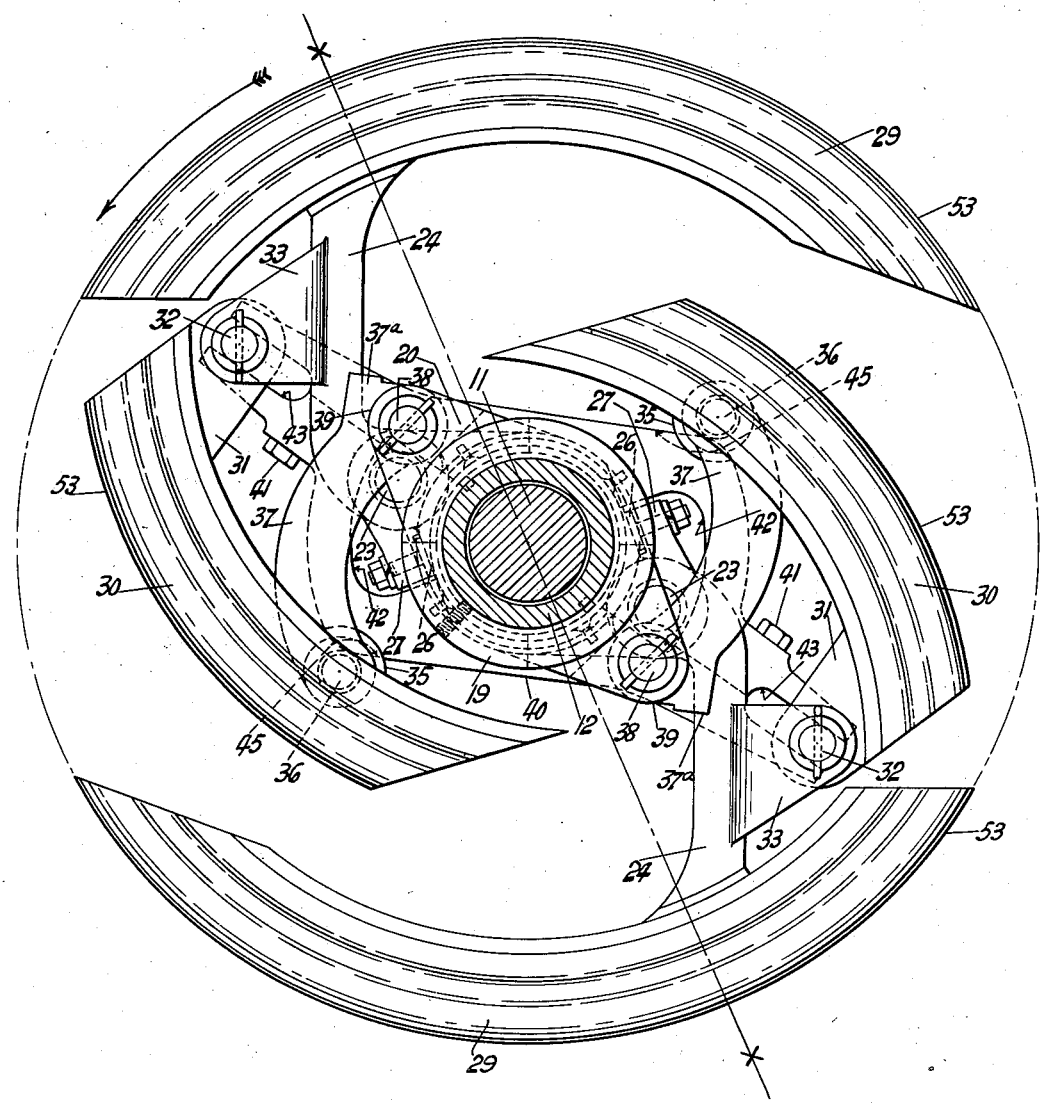
Figure 6 is a view similar to Figure 5 showing the initial collapsing movement of the drum.

In the operation of the apparatus, the expanded drum is driven in the direction indicated by the arrows by the rotation of the spindle 11, the quill 12 also rotating therewith because of the interconnection of the spindle and quill through the drum structure. A tire casing (not shown) may be built upon the drum in the usual or preferred manner, and when it is desired to remove the finished tire the drum is collapsed simply by depressing the hand-lever 15a so as to apply the brake band 15 to the brake drum 14 and thus to stop rotation of the quill 12, whereby relative movement between the quill and spindle is effected. As the drum reaches collapsed position the operator throws the switch to the driving motor to disconnect the spindle from its driving means. The operation of the respective members during the collapsing of the drum will best be understood by reference to Figures 5, 6 and 7 of the drawings, which for purposes of illustration show the intermediate sections 29 at top and bottom in the several views. The angular movement of the drum during the collapsing operation will be apparent by reference to the datum line X—X, assuming said line to be in horizontal position during the entire collapsing operation.

When rotation of the quill 12 stops, the toggle structure 20 and pivot pins 38 also stop, but the spindle 11, hub 18, control plate 40, pivot pins 23 and drum sections continue their counter-clockwise angular movement as indicated by the arrows in the several figures. Rotative movement of the drum moves the pivot pins 36 relatively of the now stationary pivot pins 38, and carries them past center with relation to the latter and the axis of the drum. Since the link 37 causes the pins 36 to move about the pins 38 as axes, it will be apparent that the free ends of the key sections will be pulled inwardly, said key sections pivoting about the pivot pins 32. This initial collapsing movement of the drum continues until the pivot pins 36 strike the cam surfaces 45 of the control plate 40, the several elements of the apparatus then being in the respective positions shown in Figure 6. Centrifugal force prevents pivotal movement of the intermediate drum sections 29 upon their pivot pins 23 during the initial drum-collapsing operation.

Figure 7:
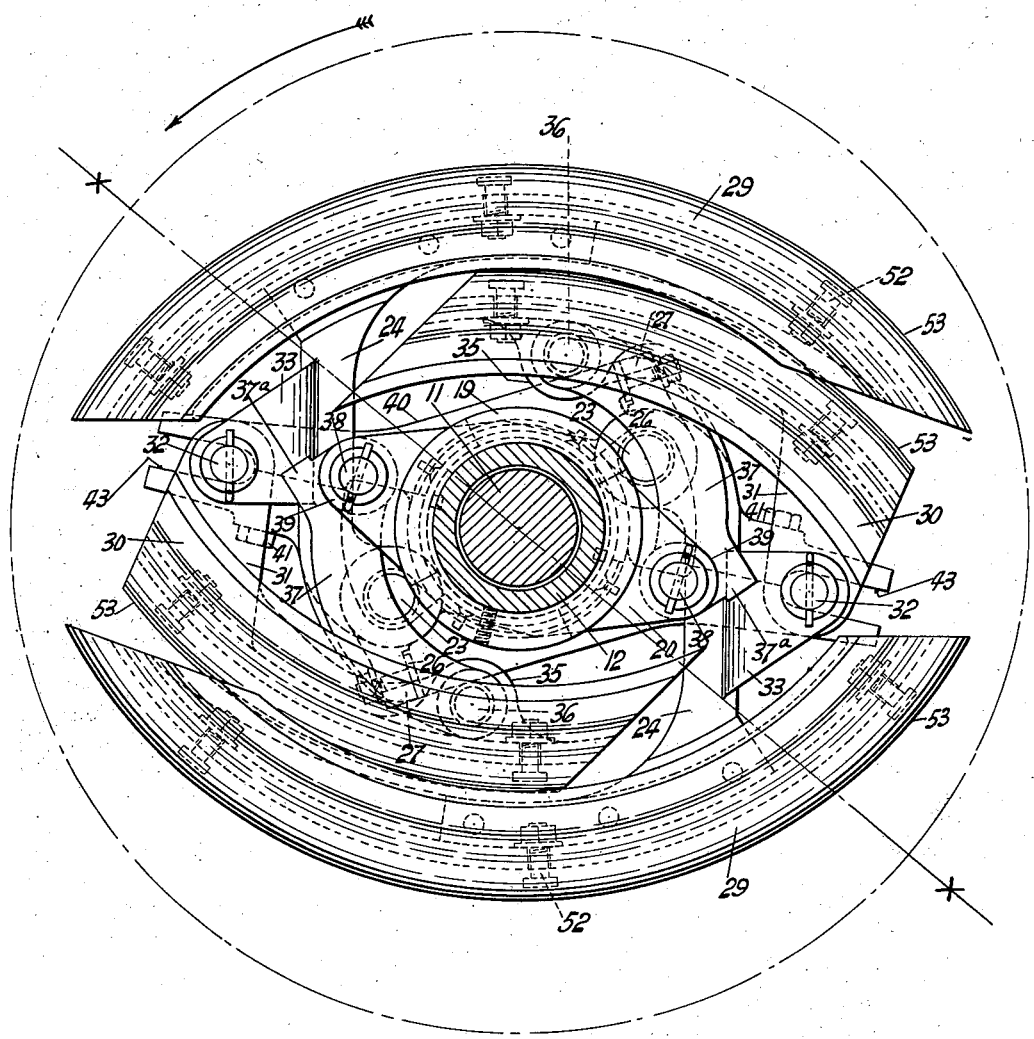
Figure 7 is a view similar to Figure 5 showing the drum in fully collapsed condition.

The point at which the pivot pins 36 strike the control plate 40 is so situated that further forward movement of the control plate is prevented by the links 37, with the result that orbital movement of the pivot pins 32 about the spindle is arrested. Thereupon continued movement of the hub 18 and pivot pins 23 causes the arms 24 to swing pivotally on the latter and thus to fold the intermediate sections 29 inwardly toward the axis of the drum, the pivot pins 32 moving radially inwardly in the slots 43 of the control plate during this operation. Said inward movement of the pivot pins 32 moves the key sections 30 substantially longitudinally, their pivot pins 36 sliding over the cam surfaces 45 of the control plate which will retrogress a trifle (about 5 degrees) since the pins 36 must move about the pins 38 as axes. When the several elements of the drum reach the completely collapsed positions shown in Figure 7, they are brought to rest by the wear plates 26 which strike the lugs 35 on the key sections, as is shown in Figure 7, all other movable parts of the drum being in spaced relation. Thus it will be observed that the power applied to the key sections to collapse the same is translated, by means of the control plate 40, to the arms 24 to effect collapse of the intermediate sections.

The drum is expanded to operative position simply by driving it forward with the brake released, centrifugal force serving to throw the sections outwardly, the intermediate sections 29 moving outwardly until the stop plates 26 of the arms 24 engage the flattened portions 28 of the hub 18, and the key sections 30 moving outwardly until their pivot pins 36 move past center with relation to the pivot pins 38 and the axis of the spindle 11. In this position the parts are locked together and cannot be collapsed by pressure against the outer surface of the drum. Also the drum can be forced into expanded condition by driving it backward, and applying the brake intermittently to the sleeve 12.

The control plate 40 not only functions to effect the collapsing of the intermediate sections 29, but assures that their movement will be synchronized, and that when the drum is stopped the lowermost intermediate section will not drop outwardly by gravity.

The drum structure consists of relatively few parts, and said parts can be sufficiently rugged to withstand the shocks and jolts incidental to the collapsing of the drum without danger of breakage. The feature of pivotally mounting the key sections on the arms that carry the intermediate sections provides accessibility to the inner surface of the drum so that lateral adjustments of the drum are easily and quickly made, especially when the body portions and lateral portions of the drum are complementally grooved or knurled as shown.

Since the drum structure has relatively few parts there is sufficient space to provide two-point supports for all pivotal connections so that excessive strain on the latter is avoided and the sections remain truly in alignment. The stop plates 26 are easily replaced in the event that they become worn.

The drum has maximum collapsing capacity so that tires of a substantial range of sizes may be built thereon, and is in balanced condition at all times. The upkeep of the drum is low, and it may be manufactured at lower cost than drums of the same type heretofore provided.

Modifications may be resorted to within the scope of the appended claims which are not limited wholly to the specific construction shown and described.

What is claimed is:—

1. In a collapsible drum the combination of a spindle, a quill mounted for relative angular movement thereon, a hub mounted upon the spindle, a pair of key sections and a pair of intermediate sections constituting a sectional tire building drum, respective arms pivotally mounted upon the hub and constituting the sole support for the intermediate sections, the key sections being hinged to said arms, and links connecting the respective key sections to the quill.

2. A combination as defined in claim 1 including means for limiting the pivotal movement of the arms in one direction to define the normal operative position of the intermediate sections.

3. In a collapsible drum the combination of a pair of key sections and a pair of intermediate sections constituting an annular tire building drum, pivotally mounted arms supporting the intermediate sections, said key sections being hinged upon said arms, respective links connected to the free ends of said key sections adapted to draw them toward the center of the drum, and a control plate adapted to engage the key sections at a determinate point and to translate the power applied to said key sections to the arms supporting the intermediate sections to fold the latter toward the center of the drum.

4. A combination as defined in claim 3 in which the control plate is so constructed and arranged as to synchronize the movements of the intermediate drum-sections.

5. In a collapsible drum, the combination of a spindle, a quill journaled thereon for relative rotary movement, a hub mounted upon the spindle, a sectional tire building drum comprising key sections and intermediate sections, arms pivotally mounted upon the hub and carrying the intermediate sections, the key sections being hinged to said arms, respective links connecting the free ends of the key sections to the quill, and a control plate journaled upon the hub having portions thereof slidably engaging the said arms at intermediate points between their pivots and the drum sections carried by the arms.

6. A combination as defined in claim 5 in which the control plate has forked portions slidably engaging the pivot pins of the key sections that are mounted upon the arms.

7. In a collapsible drum the combination of a rotatable spindle, a quill journaled thereon for relative rotary movement, a hub mounted upon the spindle, a sectional tire building drum comprising key sections and intermediate sections, arms pivotally mounted upon the hub supporting said intermediate sections, said key sections being pivotally mounted upon said arms, respective links connecting the free ends of the key sections to the quill for collapsing said key sections, and a control plate journaled upon the hub and formed with marginal cams adapted to be engaged by the key sections during the collapsing thereof to control the subsequent movement of said sections.

8. A combination as defined in claim 7 in which the control plate is so connected to the arms that support the intermediate sections as to collapse the latter after being engaged by the key sections.

9. In a collapsible drum the combination of a pair of key sections and a pair of intermediate sections constituting an annular drum, pivotal supports for said drum sections, power means for folding the key sections on their pivots toward the center of the drum, and a control plate connected to the intermediate sections adapted to be engaged by the inwardly moving key sections and to translate the power applied to the latter to the intermediate sections to effect collapse of the latter.

10. A combination as defined in claim 9 in which the control plate is slidably connected to the intermediate sections in a manner to synchronize the movements of the latter.

11. In a collapsible drum the combination of a pair of key sections and a pair of intermediate sections constituting an annular drum, pivotal supports for the intermediate sections, the key sections being pivotally mounted on said supports, power means for folding the key sections on their pivots toward the center of the drum, and an angularly movable control plate connected to the supports of the intermediate sections and formed with marginal cam surfaces adapted to be engaged by the key sections in their collapsing movement to alter the movement of the key sections and to cause them to swing their supporting arms about their pivots to effect collapse of the intermediate sections.

12. In a collapsible drum, the combination of a pair of key sections and a pair of intermediate sections constituting an annular tire building drum, a pair of pivotally mounted arms, to the outer ends of which the said intermediate sections are fixedly mounted, each arm constituting the sole support for its drum section, the key sections being hinged to the respective arms, respective links connected to the free ends of the key sections for folding the latter toward the center of the drum, and means for applying force to the said arms to swing them on their pivots and thereby to move the intermediate sections toward the center of the drum.

FRED BROWN PFEIFFER.